No. 652,834. Patented July 3, 1900.
S. H. CASWELL.
COVER FOR CREAM SEPARATORS.
(Application filed Mar. 16, 1900.)
(No Model.)
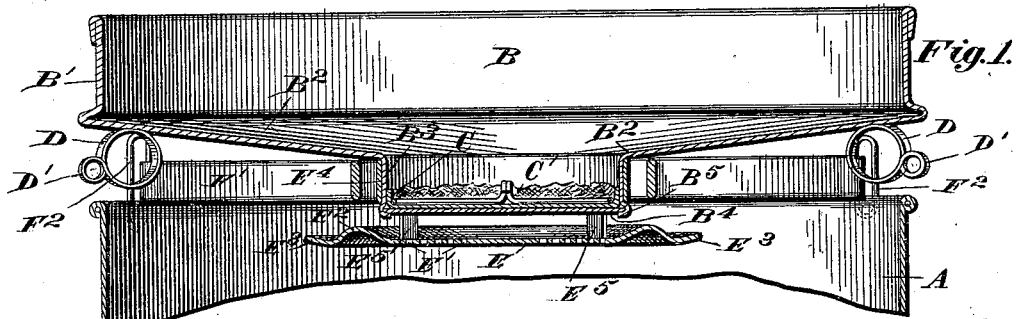
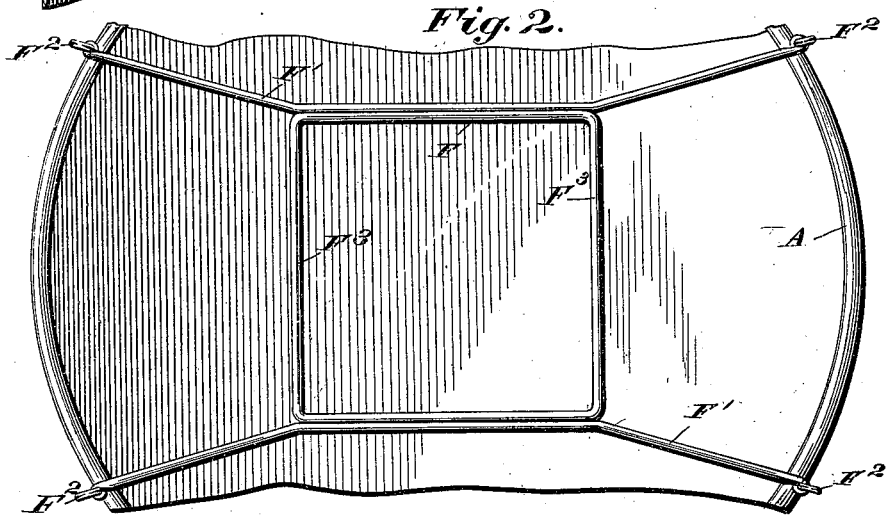
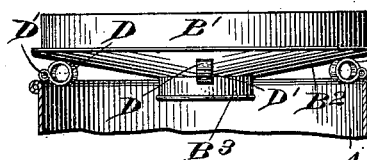
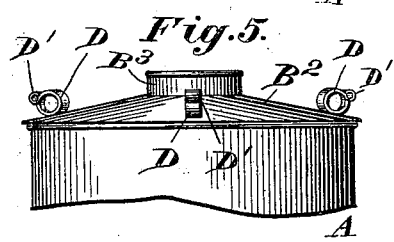
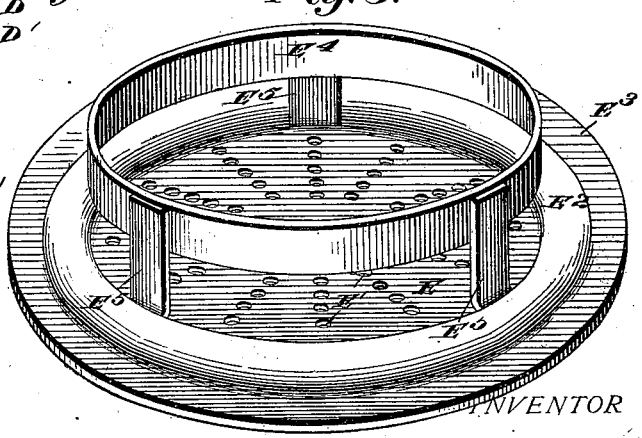
WITNESSES:
L. C. Hills
Alfred T. Gage
INVENTOR
Sheldon H. Caswell,
BY E. B. Stocking
Attorney

UNITED STATES PATENT OFFICE.

SHELDON H. CASWELL, OF NEWARK, NEW YORK.

COVER FOR CREAM-SEPARATORS.

SPECIFICATION forming part of Letters Patent No. 652,834, dated July 3, 1900.

Application filed March 16, 1900. Serial No. 8,933. (No model.)

*To all whom it may concern:*

Be it known that I, SHELDON H. CASWELL, a citizen of the United States, residing at Newark, in the county of Wayne, State of New York, have invented certain new and useful Improvements in Covers for Cream-Separators, of which the following is a specification, reference being had therein to the accompanying drawings.

This invention relates to a cover for cream-separators, and particularly to one having devices by which the milk introduced into the separator may be strained or aerated and under other conditions the can containing the milk can be thoroughly ventilated, while the entrance of dust or dirt thereinto is prevented.

The invention has for an object to provide a conical form of cover having at its apex a screened aperture which may be used as a straining device, and about the walls of this aperture a removable aerating device is adapted to be secured, so that the plate thereof will receive the liquid passing through the strainer.

A further object of the invention is to provide an improved form of aerating device by means of which a small quantity of liquid will be retained over the apertures in the aerating-plate and the balance permitted to overflow from the edge of said plate.

A further object of the invention is to provide means for supporting the cover when used as a straining or aerating device above the body of the can and against any tilting movement of the same.

Other objects and advantages of the invention will hereinafter appear in the following description, and the novel features thereof will be particularly pointed out in the appended claims.

In the drawings, Figure 1 represents a vertical section of the invention with the parts arranged for the purpose of aeration. Fig. 2 is a plan showing the holder for retaining the cover in position. Fig. 3 is a perspective of the aerating device removed from the cover. Fig. 4 is a detail elevation of the cover when used for straining purposes, and Fig. 5 is a similar view with the cover applied to close a can and permit ventilation of the same.

Like letters of reference indicate like parts throughout the several figures of the drawings.

The letter A indicates the can of a cream-separator, which may be of any desired configuration, but usually of circular form, as shown in the present application. The cover B of this can is provided with a flange portion B', adapted to fit within the walls of the can and with a top of substantially-conical shape, having inclined walls $B^2$, extending to a central circular discharge-aperture $B^3$, which is provided with a screening-surface $B^4$. The parts thus far described permit a straining of the milk; but in order to catch any particles which might pass through the screen a fabric or thin cloth C may be placed over the screen and held in position by an annular metallic ring C' of elastic character, which holds the cloth C in an extended position over the screening-surface. The cover is also provided upon its outer face with lifting-rings D, through which the finger may be passed to lift the cover, and these rings are also supplied with a smaller ring D', which is adapted to rest upon the edge of the can and support the cover above the same, as shown in Fig. 4, in case the holding device particularly designed therefor is not used.

For the purpose of aerating the milk I have provided an improved construction of aerating-plate embodying a substantially-horizontal plate E, provided with a series of perforations E' and with an annular convex bead or flange $E^2$ between the perforated portion and the edge $E^3$ of the plate over which the liquid is discharged. This plate is removably held in position by means of a band $E^4$, from which supporting-arms $E^5$ extend and are connected to the plate E. The band is adapted to fit the circular portion $B^3$ of the cover and is held in position against accidental removal or displacement by means of the bead $B^5$ at the lower end of the circular portion $B^3$. With this aerating device the liquid flows upon the plate E and is discharged through the apertures in the same for the purpose of aeration. If, however, sufficient liquid passes through the screen to fill the central depression within the annular flange $E^2$, the same flows over this flange and is discharged at the edge portion $E^3$ in a thin stream, thus producing an aeration of the milk along the entire periphery of the plate as well as at its central portion and secures results which are not obtainable when the overflow from an aerating device passes into the separator in a solid stream.

During the operation of aerating the milk or straining the same it is desirable to retain the cover in position above the top of the can to allow the free access of air to the milk passing from the aerator. This is accomplished by means of a holding-frame F, which is composed of cross-bars F', extending from one side of the can to the other and provided at their ends with vertical posts $F^2$, extending in opposite directions from the ends of the cross-bars F' and at substantially right angles thereto. These posts or standards prevent the accidental displacement of the holding-frame from the can, and the post $F^2$ thereof, which extends above the frame, engages the inclined wall $B^2$ of the cover, thus preventing any tipping or tilting of the same if the milk be poured into the cover at one side thereof, or if any object be rested upon the cover, and thus all danger of overturning the cover is avoided. At the central portion of the can the cross-bars F' are connected together by a frame $F^3$ of any suitable configuration, through which the circular portion of the cover is passed and upon the upper edges of which the inclined walls of the cover rest.

In the use of the invention for the purpose of aerating the milk the cover is supported above the top of the can by means of the holding-frame F, and the milk passes through the cloth and screen, falling upon the aerating-plate, by which it is distributed and exposed to the air in its downward movement into the can, all of which is effected with the parts arranged as in Fig. 1. If it be desired, however, to simply strain the milk, this could be readily accomplished by turning the cover into the position shown in Fig. 4 and without the necessity of applying the holding-frame or aerating device, while when the cover is applied in the position shown in Fig. 5 the contents of the can will be ventilated without permitting the entrance of dust or other foreign matter into the same. In many cases it is desired to stretch a cloth covering over the body of the can, and this may be conveniently held in position by resting the frame F thereon.

It will be seen that the aerator described is removable, so that it can be cleansed, and is very efficient in its action, as it provides for the distribution of the milk in the most minute particles to permit the thorough aeration of the same. The holding-band C' for the cloth above the screen is readily removable, so that the cloth can be replaced whenever desired. It will also be noticed that the rim B' upon the cover is extended to such a length as to form a retaining-receptacle for the milk to be strained, and when reversed upon the can in the position shown in Fig. 5 carries all drainage into the body of the can. The holding-frame for the cover when used as an aerator also firmly supports the same against tilting or accidental displacement, as it obtains a bearing at two points upon the inclined wall of the cover, or may be used to hold in position a cloth for preventing the entrance of dirt or insects into the can, as shown by dotted lines in Fig. 1.

It will be obvious that changes can be made in the details of construction and configuration of the several parts without departing from the spirit of the invention as defined by the appended claims.

Having described my invention, what I claim as new is—

1. A cover for creaming-cans formed with an aperture provided with a screen, a horizontally-disposed aerating-plate having a perforated central portion separated from its periphery by an annular convex flange, and means for supporting said plate beneath said screen to receive and aerate liquid passing through said screen; substantially as specified.

2. An aerating-plate for a creaming apparatus comprising a substantially-flat plate having a perforated central portion surrounded by an annular convex bead, and a peripheral discharge portion beyond this bead, a band for supporting said plate, and hangers extending from said band to said plate; substantially as specified.

3. A cover for cream-separators provided with a discharging-neck having a screening-surface, a band surrounding said neck, and an aerating-plate supported from said band and provided with a perforated central portion separated from its periphery by an annular convex flange; substantially as specified.

4. A cover for cream-separators provided with a discharging-neck having a screening-surface, a band surrounding said neck, and an aerating-plate supported from said band and provided with a perforated central portion separated from its periphery by an annular convex flange, a holder for said cover having a supporting-frame surrounding the central discharge-neck of the cover and provided at its ends with posts extending downward to engage the side of the can and upward to engage the inclined wall of the cover; substantially as specified.

5. A holder for a cover or strainer consisting of cross-arms, a frame connecting the same, and posts or standards at the ends of said frame extending above and below the arms at substantially a right angle thereto; substantially as specified.

In testimony whereof I affix my signature in presence of two witnesses.

SHELDON H. CASWELL.

Witnesses:
 PETER R. SLEIGHT,
 L. M. GENTHNER.